March 24, 1959 — C. J. BINKS — 2,878,836

TWO-PIECE FLOW CONTROL VALVE

Filed May 13, 1957

INVENTOR
Chester J. Binks
BY
H. F. Johnston
ATTORNEY

United States Patent Office 2,878,836
Patented Mar. 24, 1959

2,878,836

TWO-PIECE FLOW CONTROL VALVE

Chester J. Binks, La Grange, Ill., assignor to Scovill Manufacturing Company, Waterbury, Conn., a corporation of Connecticut Application May 13, 1957, Serial No. 658,699

3 Claims. (Cl. 138—45)

My invention relates to improvements in variable flow restrictors whose purpose is to maintain a substantially constant rate of flow or delivery of fluid over the wide range of pressures which may be encountered in water supply systems throughout the country.

Various flow restrictors have been devised and used which accomplish the purpose in a general way but are only partially satisfactory. In particular, the flow restrictors which have been proposed do not ensure a satisfactory rate of flow at the lower range of pressures which may be encountered in some home water supply systems. The disadvantage of the use of such device in automatic washing machines, for example, is obvious.

The principal object of my invention, therefore, is to provide a new and improved variable flow restrictor which will provide a satisfactory rate of flow at the lower pressures and maintain such rate of flow substantially uniform throughout the entire range of pressures likely to be encountered.

My invention utilizes among other things, the principle that a central passageway through an annular member of rubber or other suitable resilient material will automatically be restricted dependent upon the upstream pressure to which such member is subjected. If, however, such a passage has the dimensions to provide proper flow at the higher pressures, it will not provide a sufficient flow at the lower pressures. Although it has been proposed to provide by-pass passages which will automatically cut off when the pressure reaches a certain level, such prior devices have not been satisfactory to produce a level flow curve partly because the central passage was substantially dimensionally restricted at the time the by-pass was cut off. Preferably, the by-pass flow is under the control of an accurately predetermined axial gap, which is controlled by the compressive action of the fluid on the resilient member.

An object of my invention is to provide a flow restrictor having in combination with a central passage, a by-pass which will progressively cut off during increases in pressure along the lower range without substantially restricting the central passage and when the by-pass is cut off the restriction of the central passage will be in proportion to the pressure on the upstream side. In my improved flow control, the central passage is also restricted by compressive action of the fluid on the resilient member, rather than flexing of the body of the member.

It is also an objective to accomplish all of the above results and at the same time keep the bulk, cost of manufacture and assembly all at a minimum.

In the accompanying drawings, I have shown for purpose of illustration, one embodiment which my invention may assume in practice.

Figure 1:
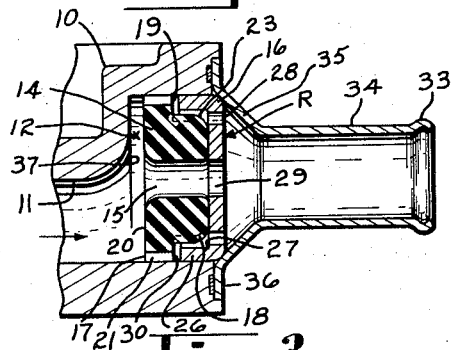
Fig. 1 is a central cross-section through one end of a typical valve body equipped with my improved flow restrictor and showing the position of parts at zero pressure.
Figure 2:
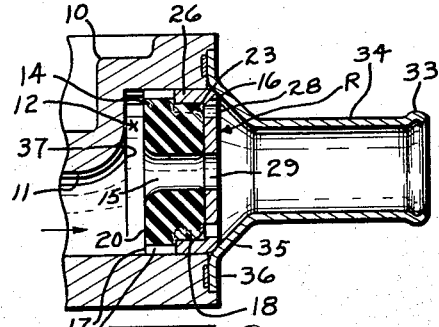
Fig. 2 is a similar view showing the position of parts at the upper portion of the lower range of pressure where the by-pass has just been cut off.

In the embodiment of my invention illustrated in the drawing, I have shown a portion of a casing 10 which may be a valve body such as used in control valves for washing machines and the like. The casing 10 is shown as having a fluid conduit 11 leading into a chamber 12 opening through the outlet end of the body 10. It will be noted that the chamber 12 may be off-set relatively to the fluid conduit 11 and the fluid flows into said chamber from said conduit in the direction as indicated by the arrow in Fig. 1.

Figure 4:
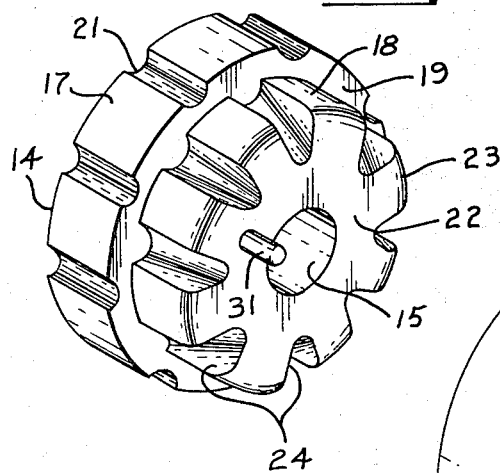
Fig. 4 is a perspective view of the resilient portion of the device.
Figure 5:
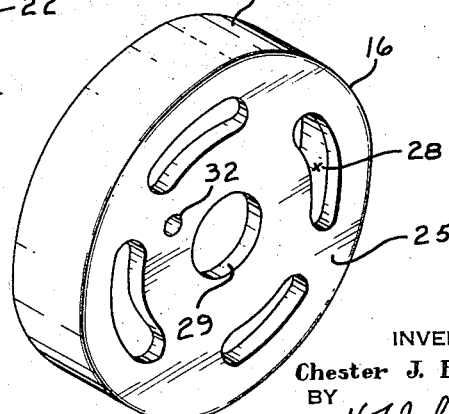
Fig. 5 is a perspective view of the rigid part of the device.

The flow restrictor R is a two-part unit consisting of an annular member 14 of resilient material having a central passage 15 therethrough and a cup-shaped member 16 of rigid material, preferably metal. Specifically the resilient member 14 has a large diameter rim portion 17 and a smaller diameter portion 18 providing an annular shoulder 19 therebetween. The resilient member 14 has a large end surface 20 that is normally flat and facing upstream so that it is always subjected to the pressure of the incoming fluid. A series of axial grooves 21 extend across the periphery of the rim or larger diameter portion from the surface 20 to the shoulder 19. The smaller diameter portion 18 terminates in a flat base 22 and the surface of said smaller portion joins said base by a relatively large radius surface 23. The surface of the smaller portion 18 is also formed with a series of equally spaced grooves 24 that extend across its periphery from the shoulder 19 and intercept the radius surface 23. The number and shape of the grooves 21 and 24 may be varied as desired. It will be noted from Fig. 4 that the grooves 24 in the smaller portion 18 are staggered relative to the grooves 21 in the larger rim portion 17 for reasons as will appear later.

The rigid cup-shaped member 16 surrounding said smaller diameter portion 18 of the resilient member 14 consists of a flat base 25 and a cylindrical wall 26, it being noted that normally there is an annular clearance space between the inner corner 27 of the member 16 and the surface 23 of the resilient member when the valve is inactive. The base 25 is pierced with a series circularly arranged arcuate openings 28 and also with a central opening 29 that is substantially the same size as and lines up with the central passage 15 in the resilient member 14. The O.D. of the member 16 and of the larger diameter portion of the resilient member 14 are such as to provide for a free sliding fit within the chamber 12.

As noted in Fig. 1 the reduced portion 18 only of the resilient member 14 is seated within the cup-shaped member 16 and when its end face 22 is abutted against the flat base 25, the axial dimensions of said reduced section and the cylindrical wall of the cup-shaped member 16 under normal unstressed conditions provide for an axial gap 30 between the shoulder 19 and the free end of the wall 26. To prevent relative turning of the resilient member 14 within the cup-shaped member 16 and to assure that the grooves 24 will line up with the arcuate openings 28, a projecting pin 31 is provided on the end face 22 of the smaller section 18 that fits in a hole 32 in the flat base 25. The pin can have a sufficiently tight fit in the hole 32 to hold the two parts together to facilitate assembly in the valve body. The axial gap 30 is accurately dimensioned to permit the desired predetermined volume of the by-pass flow, it being understood that the grooves 21 or 24 will not substantially restrict such flow. This axial gap will of course depend on the pressure to which the resilient member 14 is subjected and when the pressure is above a predetermined amount the gap 30 will close entirely, thus closing off the by-pass flow in one stage.

An outlet connection or fitting 33 is attached to the body 10 in line with the chamber 12. Specifically the fitting 33 comprises a discharge nipple 34 having an integrally flared portion 35 terminating into a circumferential flange 36 the latter being made secure to the body 10 as by screws (not shown). The flared portion 35 provides a stop for the restrictor unit R when fluid is passing through the valve. As pointed out above, the flow-restrictor unit R has a free sliding fit within the chamber 12 to allow freedom of axial movement for said restrictor unit R within said chamber, the movement being limited by the fitting flared portion 35 at one end and the base wall 37 of the chamber 12 at the other end.

Operation

Figure 3:
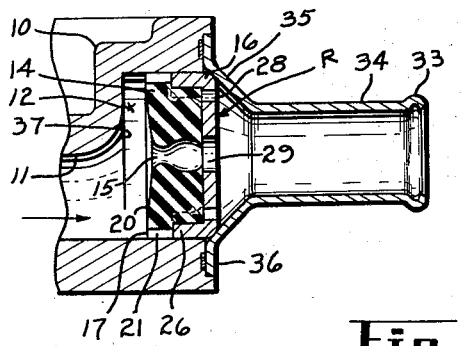
Fig. 3 is a similar view showing a position of parts in the higher pressure range.
Figure 6:
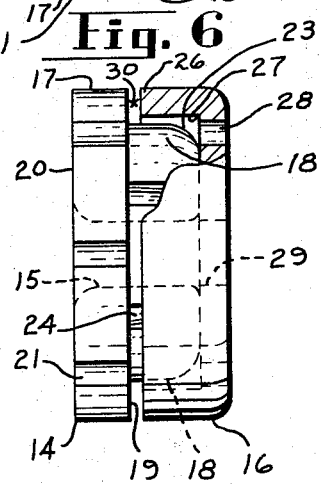
Fig. 6 is a side view of the flow restrictor having a portion of the wall of one member broken away.

In the operation of the flow restrictor unit R in its normal inactive position or at zero pressure, the unit will appear as shown in Fig. 1. The fluid will pass freely through the central passages 15 and 29 as well as through the grooves 21, the axial gap 30, the grooves 24, the arcuate piercings 28 and into the outlet fitting 33. The building up pressure in the lower ranges will cause the smaller diameter portion 18 of the resilient member 14 to be gradually compressed within the cup-shaped member 16 causing the inner end of the flange 26 to approach and finally at a predetermined pressure to seat against the shoulder 19 consequently closing the gap 30 and shutting off all fluid communication between the grooves 21 and 24. Beyond this limit, any additional fluid pressure upon the resilient member 14 will cause the whole element to be compressed and gradually to restrict the central opening 15 as shown in Fig. 3 where the resilient material has been deformed inwardly. This method of restricting the central passage by compressive action rather than by flexing is believed to produce more uniform and reliable results. It will be noted that in the lower range of pressures the by-pass water through grooves 21 and 24 converges with the water through the central passage 15 below the flow control unit R in the flared portion 35 of the discharge nipple 34 thus minimizing turbulence and permitting maximum flow at the lower pressures.

One form of the invention is presented herein for the purpose of exemplification, but it will be appreciated that the invention is susceptible of changes and other structurally modified forms coming equally within the scope of the appended claims.

I claim:

1. In combination with a fluid conduit, a variable flow restrictor enclosed and confined by said conduit, said restrictor comprising an annular member of resilient material having a central passage therethrough with a larger diameter rim portion facing the upstream side of the conduit and exposed across its end face to the upstream pressure, a smaller diameter portion facing the downstream side providing an annular shoulder facing in a downstream direction between the two portions, means permitting a by-pass flow around the periphery of said rim portion and also around said smaller diameter portion, means bearing against the end face of the smaller diameter portion to support the same, and means surrounding the smaller diameter portion, the upper edge of which is separated from said shoulder by a narrow axial gap between said edge and shoulder which gap is progressively closed when the resilient member is compressed by increasing pressures to progressively shut off the by-pass of fluid through said axial gap.

2. In combination with a fluid conduit, a variable flow restrictor enclosed and confined by said conduit, said restrictor comprising an annular member of resilient material having a central passage therethrough with a larger diameter rim portion facing the upstream side of the conduit and exposed across its end face to the upstream pressure, a smaller diameter portion facing the downstream side providing an annular shoulder between the two portions, means permitting a by-pass flow around the periphery of said rim portion and also around said smaller diameter portion comprising a series of grooves across the periphery of said rim portion, a second series of grooves across the periphery of said small diameter portion, a rigid cup-shaped member surrounding said smaller diameter portion and terminating short of said shoulder to provide a narrow axial gap between the cup and shoulder, the end of said cup-shaped member extending substantially across the end of the resilient member and having a central opening registering with the central passage in the resilient member, and other passages registered with the grooves in the small diameter portion, and means in the conduit acting as a stop for said cup-shaped member whereby the by-pass flow through said grooves and axial gap is progressively throttled by endwise compression of said resilient member upon increase of pressure on the upstream side of the conduit.

3. The combination defined in claim 2 wherein the grooves in the larger diameter rim portion are shallower than the depth of the shoulder between the two portions.

References Cited in the file of this patent
UNITED STATES PATENTS

| | | |
|---|---|---|
| 2,728,355 | Dahl | Dec. 27, 1955 |
| 2,815,041 | Rimsha et al. | Dec. 3, 1957 |